(12) United States Patent
Banerjee et al.

(10) Patent No.: US 7,599,788 B1
(45) Date of Patent: Oct. 6, 2009

(54) SYSTEM AND METHOD FOR MONITORING THE MOVEMENT OF ONE OR MORE VEHICLES

(75) Inventors: Salil Banerjee, Reston, VA (US); Sid Chaudhuri, East Brunswick, NJ (US); Howard Alan Seid, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 467 days.

(21) Appl. No.: 11/295,644

(22) Filed: Dec. 7, 2005

(51) Int. Cl.
*G06G 7/76* (2006.01)
(52) U.S. Cl. ........................................ 701/117; 705/14
(58) Field of Classification Search ................ 701/200, 701/117–119, 213–215; 342/357.06, 357.12; 705/14
See application file for complete search history.

(56) References Cited

U.S. PATENT DOCUMENTS

| | | | |
|---|---|---|---|
| 5,539,645 A * | 7/1996 | Mandhyan et al. | 701/119 |
| 6,306,063 B1 * | 10/2001 | Horgan et al. | 477/108 |
| 6,785,606 B2 * | 8/2004 | DeKock et al. | 701/117 |
| 6,845,246 B1 * | 1/2005 | Steer | 455/522 |
| 7,408,502 B2 * | 8/2008 | Percy et al. | 342/357.07 |
| 2004/0176103 A1 | 9/2004 | Dirk et al. | |
| 2005/0234772 A1 * | 10/2005 | Haruki et al. | 705/14 |
| 2007/0050248 A1 * | 3/2007 | Huang et al. | 705/14 |

OTHER PUBLICATIONS

Associated Press, High—Tech solution to highway congestion, CNN.com, Apr. 25, 2005.

* cited by examiner

*Primary Examiner*—Yonel Beaulieu (57) ABSTRACT

A system and method is provided to allow users to receive and transmit real-time traffic flow information. A service provider can utilize information gathering infrastructure to receive, store, and transmit the real-time traffic data to groups or individual users. An information-generating subscriber can provide information required to determine road traffic conditions using a cellular telephone. A system of incentives is provided to overcome the reluctance of users to transmit their individual traffic data to the service provider by assigning some amount of positive points for data transmission to a central network. Users who choose only to receive data are assigned some amount of negative points. Points are converted during the billing process to fees for using the system, whereby users who both transmit and receive data ultimately pay less for utilizing the system than users who choose only to receive data.

19 Claims, 7 Drawing Sheets

SYSTEM AND METHOD FOR MONITORING THE MOVEMENT OF ONE OR MORE VEHICLES

BACKGROUND OF THE INVENTION

Modern communications technology provides a number of different ways for people to receive real-time traffic flow information. With the advent of modern global positioning system (GPS)-enabled navigation systems, drivers can now receive their own location information via GPS satellite directly in their automobiles and elsewhere. That GPS information can be used in mapping software to allow users to determine their specific location at any latitude and longitude within the United States and in other countries. Such systems do not, however, allow or properly incentivize users to both transmit and obtain real-time traffic flow information so that traffic flow problems can be located, anticipated, mitigated and/or avoided. Commercial systems as they now exist allow a user only to receive information from GPS satellites and to determine location, but do not offer the capability of sending and receiving further information regarding real-time traffic flow patterns associated with any given roadway.

Current methods of collection and disbursement of traffic information are expensive and less effective because the information is based upon a limited sample of data points. In U.S. Pat. App. No. 20040176103, Dirk et al. disclosed a means of location dependent services that can be offered by service providers using service providing entities. In the disclosed method, a service provider entity includes an interface for communicating with the user equipment and for receiving location information from a plurality of communications systems. With the location information of the user equipment, the service provider entity can disburse requested information to the user for which the user has registered. This method does not, however, provide a means to collect information from a dynamic environment such as that associated with traffic flow.

The Federal government recently funded one project through Rensselaer Polytechnic Institute's Center for Infrastructure and Transportation Studies. The system that was developed tracks automobile movement through GPS devices in cars that are connected wirelessly. The system is reportedly an improvement over systems that merely utilize traffic sensors and roadside cameras to monitor traffic flow, but the system contains several deficiencies.

For example, the system, as well as other known systems, requires additional infrastructure for large-scale implementation of a nationwide, or worldwide, system capable of receiving and transmitting traffic flow data to and from many users. The system is also deficient in that it does not allow users to subscribe to a service capable of collecting and distributing traffic flow data according to a payment plan. Because privacy concerns may cause many users to turn off the transmitting module of their in-car wireless and GPS devices in this and other prior art systems, such systems would suffer from a dearth of data-transmitting users. Any such system would inevitably suffer from free-rider problems because it provides no incentive for users to transmit their position, speed, etc. for collection and retransmission to other users.

In view of the above-identified and other deficiencies of prior art systems, it would be desirable to provide a system and method capable of collecting and distributing reliable, real-time traffic flow data without requiring any new infrastructure.

SUMMARY OF THE INVENTION

The present invention overcomes the above identified and other deficiencies in conventional GPS-enabled navigation systems by providing a system and method to allow users to both send and receive reliable traffic flow information to and from a communication network. The invention further improves the accuracy and timeliness of traffic information by providing incentives for all users to send data, thereby increasing the number of users who do so and, ultimately, the overall amount and reliability of data contained in the system.

DETAILED DESCRIPTION OF THE PREFERRED EMBODIMENTS

Figure 1:
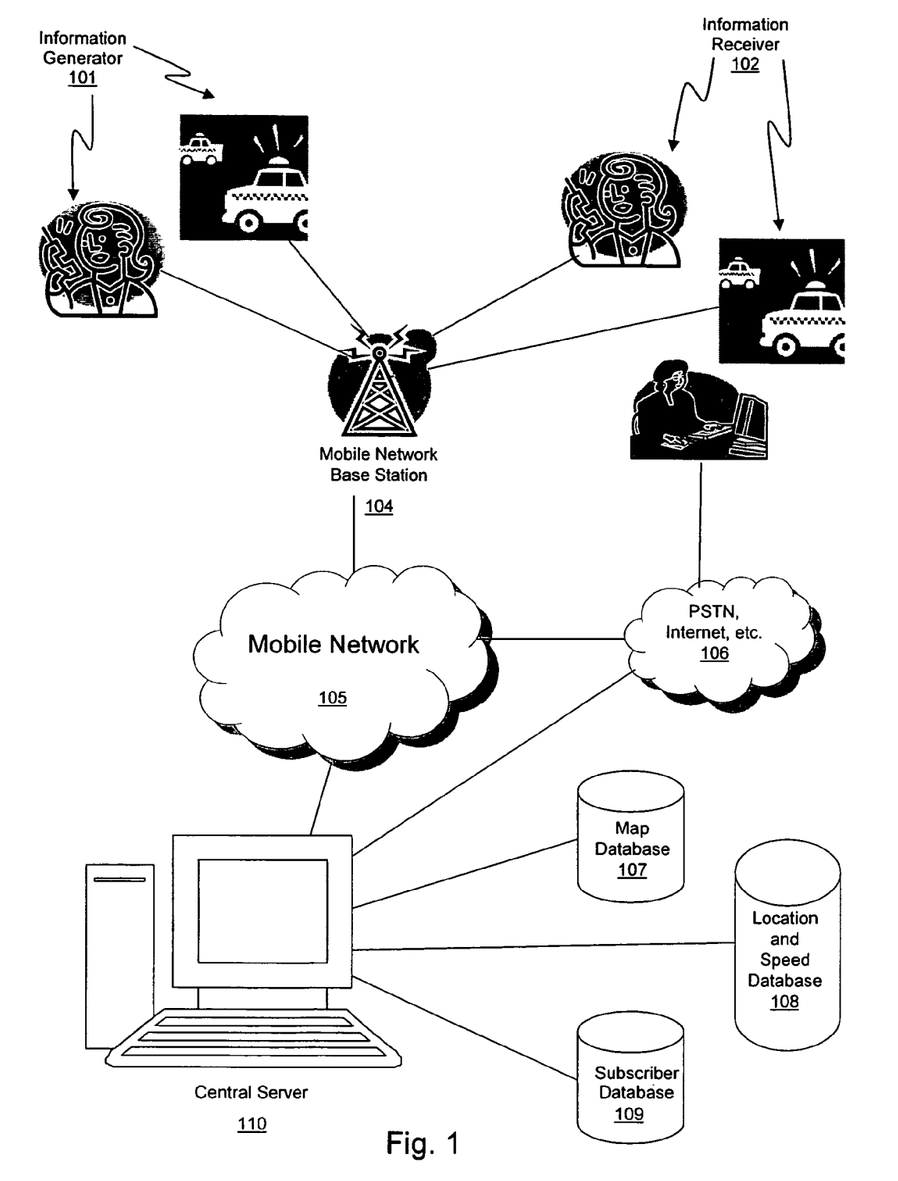
FIG. 1 is a diagram indicating the various components found in a preferred embodiment of the invention.

The invention allows a service provider to provide a service involving accurate, reliable, and up-to-date traffic flow information (also referred to as "traffic flow data") gathering and disbursement. FIG. 1 illustrates a preferred embodiment of the invention, wherein subscribers communicate with a central server 110. The central server 110 can be a general purpose computer with a processor, memory, and specialized data network services, e.g., a blade server, a personal computer utilizing server software, etc. Subscribers to the service can be divided into three basic categories: information-generating 101 (information generator); information-requesting 102 (information receiver); and combination subscribers, who are both information generator 101 and information receiver 102. Each subscriber may fall into a further subcategory or type, e.g., information receiver 102 may receive traffic flow information via cellular telephones, satellite telephones, portable laptop with wireless network connection, or some other device.

A service provider creates and maintains an up-to-date location and speed database 108 containing traffic flow data (e.g., automobile traffic between exits 25 and 30 on the beltway around Washington, D.C.) received from registered subscribers, along with corresponding received or calculated speed data. In other words, speed data can be received directly from an information generator or it can be calculated by the server before it is stored in the location and speed database 108. Traffic flow data in location and speed database 108 is, therefore, recently updated and preferably continuously updated.

The service provider also maintains a map database 107 of known road or traffic pathway segments and a subscriber database 109 of all service subscribers 101 and 102. Information generator 101 sends location data (and speed data, if so equipped) through a mobile network base station 104 and a mobile network 105 to the central server 110. Information-generation devices may include, but are not limited to: in-car GPS systems, cellular telephones, personal data assistants (PDA), laptop computers, electronic traffic signs, roadway sensors, cameras, etc.

Once traffic flow data are acquired by the server, they are stored in location and speed database 108. If speed data are not transmitted directly from information generator 101, the server can compare successive location information to determine speed, which is also stored in location and speed database 108.

Information-receiving subscribers 102 request and/or receive location and speed data from central server 110 through mobile network base station 104 and mobile network 105, or through alternative communication devices, such as the PSTN, Internet, radio station, radio transceiver, etc. 106. It is possible that the path of data transmission for all subscribers 101 and 102 (and all types of each) may also incorporate communication devices such as the PSTN, Internet, radio station, radio transceiver, independent land-based or wireless service providers, etc.

Moreover, subscribers may utilize a tremendous variety of devices and methods for both sending and requesting location and speed data in a preferred embodiment such that FIG. 1, therefore, represents only a few of the possible devices and methods. For example, subscribers may utilize wireless devices, such as: in-car GPS systems, cellular telephones, PDAs, laptop computers, etc. Subscribers may also utilize more traditional devices, such as a desktop computer, telephone, etc.

One of the many advantages of the disclosed embodiment can be found in its ability to utilize off-the-shelf components. Cellular telephones, for example, are required by law to include E911 location information capability. As such, any cellular telephone compliant with the E911 regulatory requirement is easily adaptable to the disclosed embodiment, whether it uses the GPS or network triangulation standard.

Combination information receiver 102 and information generator 101 subscribers would generally utilize a wireless, GPS-enabled device, such as a cellular telephone, to both send and receive traffic flow data to and from the central server 110 via mobile network base station 104 and mobile network 105. Information receivers 102 could utilize any device capable of receiving traffic flow data to request and/or receive location and speed data from the central server 110. Information receiver 102 could utilize, for example, a cellular telephone to request and/or receive location and speed data from the central server 110 via mobile network base station 104 and mobile network 105. Information receiver 102 may also utilize a personal computer or telephone connected to the PSTN, Internet, radio station, radio transceiver, etc. 106 to request and/or receive traffic flow data from the central server 110.

When information generators 101 sign up for the service they agree to allow the service provider to collect location and speed data and to keep it in the location and speed database 108 temporarily. According to the embodiment of FIG. 1, an information generator 101 receives positive points based on the amount and the nature of the real-time data provided. For example, more points could be assigned if pictures or video information is requested by the information receiver 102 or provided by the information generator 101, compared to mere location and speed data.

The information generator 101 could also receive more positive points if he/she agrees to be connected with an information receiver 102 for direct information exchange. The central server 110 may query whether the information generator 101 is willing to allow the information receiver 102 to be connected directly so that detailed information can be exchanged directly between the two parties. If yes, the central server 110 then connects the two subscribers over their respective networks 105, 106, and/or by any other available means. The time spent on the connection is still another factor that can also be utilized to determine the proper number of points assigned to each subscriber.

Similarly, information receivers 102 are awarded negative points for each transmission of data successfully received. The service provider can translate accumulated points for each subscriber into a periodic bill for services rendered. Because they are awarded positive points for transmitting traffic flow information to the server 110, information generators 101 will typically receive a lower bill for the same amount of system usage during any given billing cycle.

The information transmitted to information receivers 102 is not limited to electronic GPS data but can also be oral descriptions of real-time traffic flow data, still pictures, or video (e.g., taken by built-in cameras in mobile telephones by information generators 101). Depending upon the format of the traffic flow data requested, central server 110 then processes the information to suit the exact need of the information receiver 102 or the central server 110 may also simply forward the information "as is" to the information receiver 102.

To alleviate security concerns, the service provider can secure the system used to receive real-time data from information generators 101 by using a variety of available means, such as encryption software or devices. The network could also generate an ID to associate with a particular information-generating device. The system could then store traffic flow information received from the device in conjunction with the assigned ID only, rather than the subscriber's personal information. Data may be further secured by ensuring that collected data are not shared with any external entity. When data are shared directly between subscribers, the service provider can also ensure that data are secured by requiring subscribers to utilize an ID and password for authentication.

Figure 2:
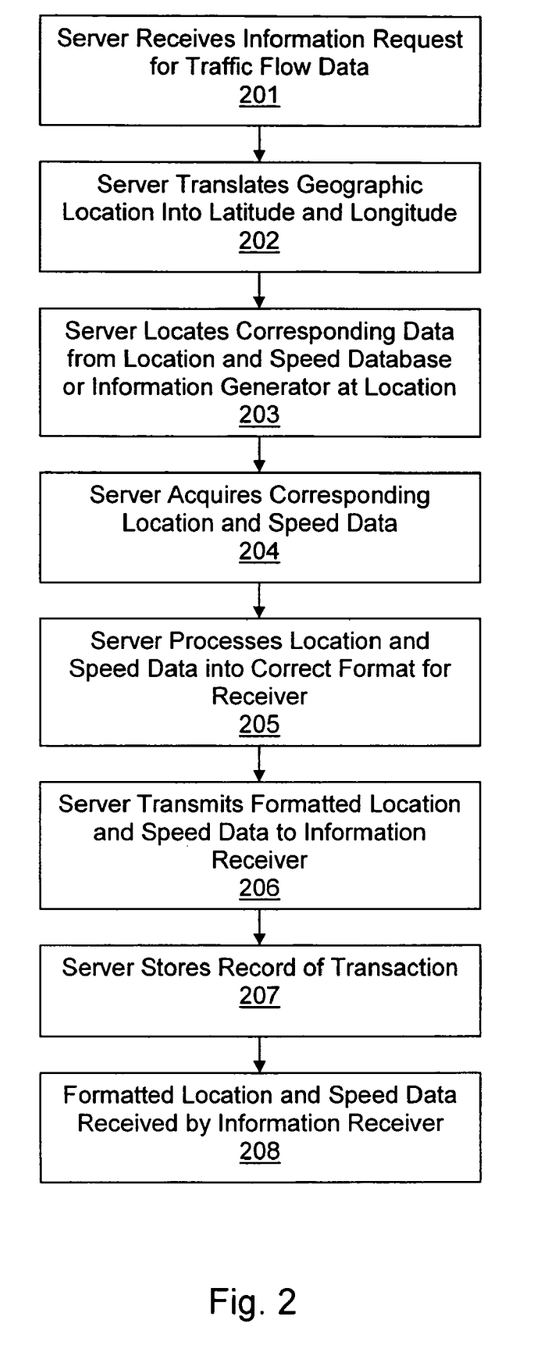
FIG. 2 is a flow chart indicating the steps involved in a typical transaction utilizing a preferred embodiment.

FIG. 2 illustrates a flow chart of the steps involved in a typical transaction, wherein a preferred embodiment sends location and speed (traffic flow) data to a subscriber. At 201 the central server receives an information request for traffic flow data from a subscriber. The central server then translates the associated geographic location of the subscriber into latitude and longitude coordinates at 202.

Based upon those coordinates, at 203 the central server locates corresponding location and speed data from the location and speed database or from an information generator located at those coordinates. The server then acquires the location and speed data at 204 and processes the data into the correct format at 205 so that the information receiver can accept the information on his/her system.

Once the location and speed data are formatted in a manner compatible with the subscriber's receiving device, the server transmits that data to the information receiver at 206. The server makes a record of the transaction at 207. Then the transaction is completed at 207 when the location and speed data are received by the information receiver. A similar process occurs when traffic flow data is transmitted from an information-generating subscriber to the central server as further illustrated in FIGS. 3 and 5 below.

Figure 3:
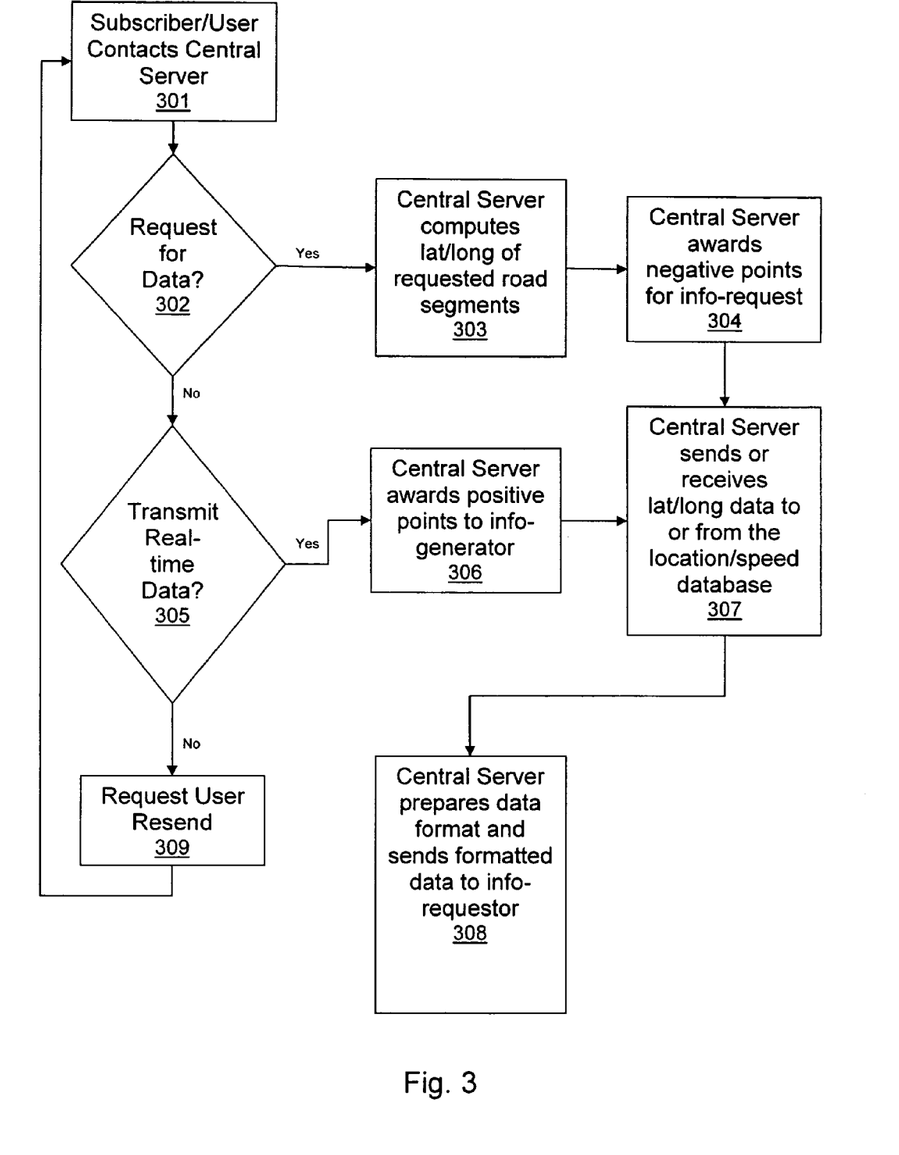
FIG. 3 is a flow chart indicating a method for sending and receiving traffic flow information.

FIG. 3 is a flow chart indicating an exemplary method for sending and receiving traffic flow information, wherein the server communicates with a subscriber to evaluate and transact the specific type of transaction required. According to the embodiment of FIG. 3, the subscriber sends or receives information to or from the central server at 301. If at 302 the communication is a request for and/or subscriber receipt of data (some subscribers may send a request in order to receive data, while others may receive data automatically without a request), the central server computes the latitude and longitude of the requested road segments at 303. The central server then awards negative points for the information request and/or receipt at 304 to the corresponding subscriber. The central server then gathers location and speed data corresponding to the requested road segments at 307 from the location and speed database. Finally, the central server formats this location and speed data and at 308 sends the formatted traffic flow data to the information receiver subscriber.

FIG. 3 also illustrates a method for an information generator subscriber to send real-time traffic flow data to the central server. The subscriber transmits location data and, if possible, speed data to the central server at 301. The subscriber may also send other types of traffic flow data, e.g., pictures, voice, or video. At 302 the communication is determined not be a request for data and at 305 the communication is determined to be a data transmission from the subscriber. The central server then awards the corresponding subscriber positive points at 306 for the real-time information generated. Finally, the central server then sends the real-time traffic flow data corresponding to the subscriber's current location or road segment at 307 to the location and speed database.

FIG. 3 also illustrates a failed attempt to contact the central server. If the server is contacted at 301 and the contact is neither a request for data at 302 nor a transmission of data at 305, then at 309 the server requests that the user resend the communication.

Figure 4:
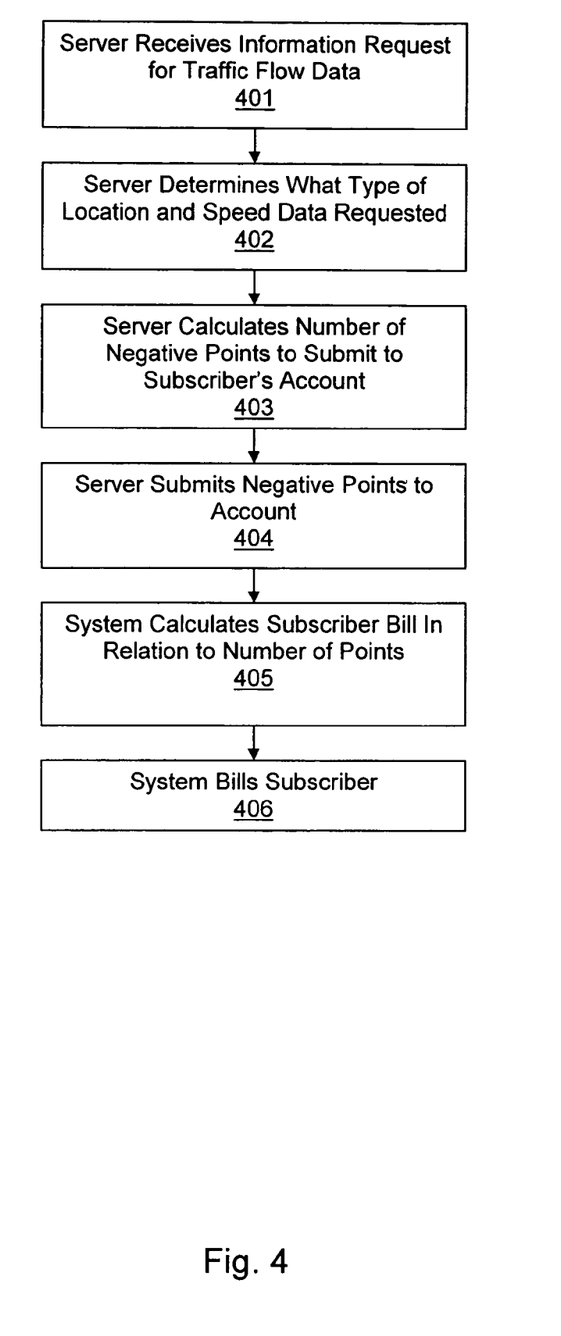
FIG. 4 is a flow chart indicating an exemplary method a service provider can utilize to provide incentives to an information-receiving subscriber so that more subscribers will agree to sign up as information-generators.
Figure 5:
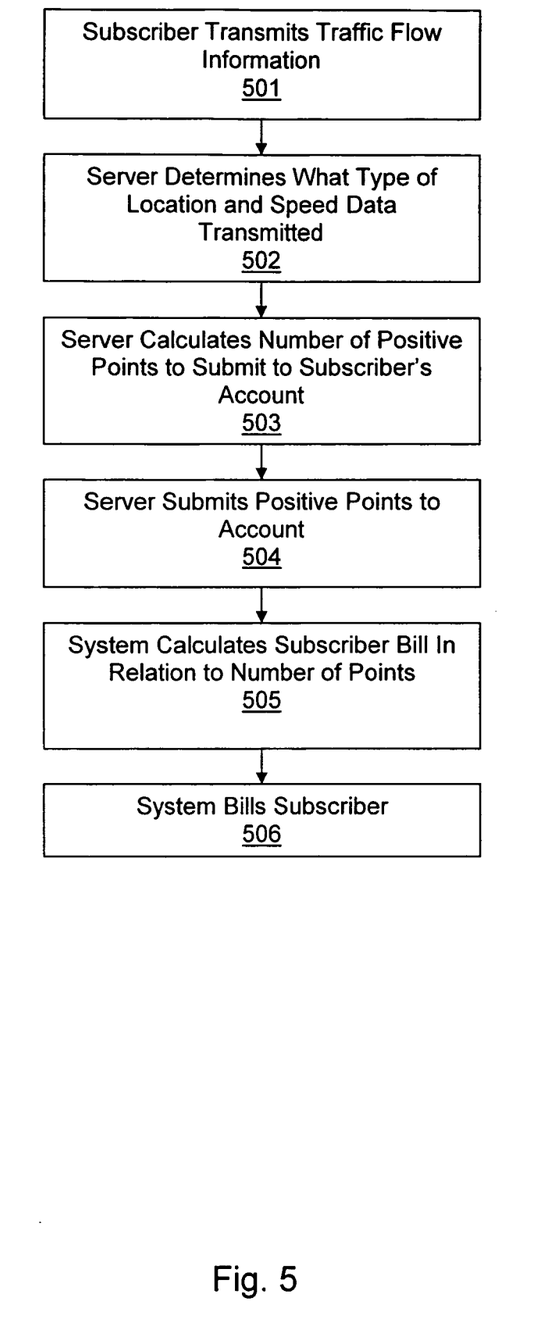
FIG. 5 is a flow chart indicating an exemplary method a service provider can utilize to provide incentives to an information-generating subscriber so that more subscribers will agree to sign up as information-generators.

FIGS. 4 & 5 are flow charts indicating exemplary methods a service provider can utilize to provide incentives to subscribers so that more subscribers will agree to sign-up as information-generators. The server receives an information request for location and speed data at 401. At 402 the server determines what type of location and speed data are requested, e.g., GPS, voice, video, or pictures. The server calculates the total number of negative points to assign at 403 based upon the type of location and speed data requested. Those points are assigned to the subscriber's account at 404. At the end of the billing cycle at 405, the system calculates the subscriber's overall bill in relation to the number of points in the account. Finally, the system bills the subscriber at 406.

FIG. 5 illustrates the same process with traffic flow data flowing in the opposite direction during generation. The subscriber transmits traffic flow information at 501. At 502 the server determines what type of traffic flow information data has been transmitted, e.g., GPS, voice, video, pictures, etc. Even though a variety of data can be sent to the server, the subscriber need not send more than simple location information to allow the embodiment to determine traffic conditions. Moreover, a preferred embodiment of the invention utilizes only location information from the information generator, wherein successive receipts of such information is utilized to calculate traffic flow information in the respective location.

The server calculates the total number of positive points to assign at 503 based upon the type of location and speed data transmitted. Those points are assigned to the subscriber's account at 504. At the end of the billing cycle at 505, the system calculates the subscriber's overall bill in relation to the number of points in the account. Finally, the system bills the subscriber at 506.

Figure 6:
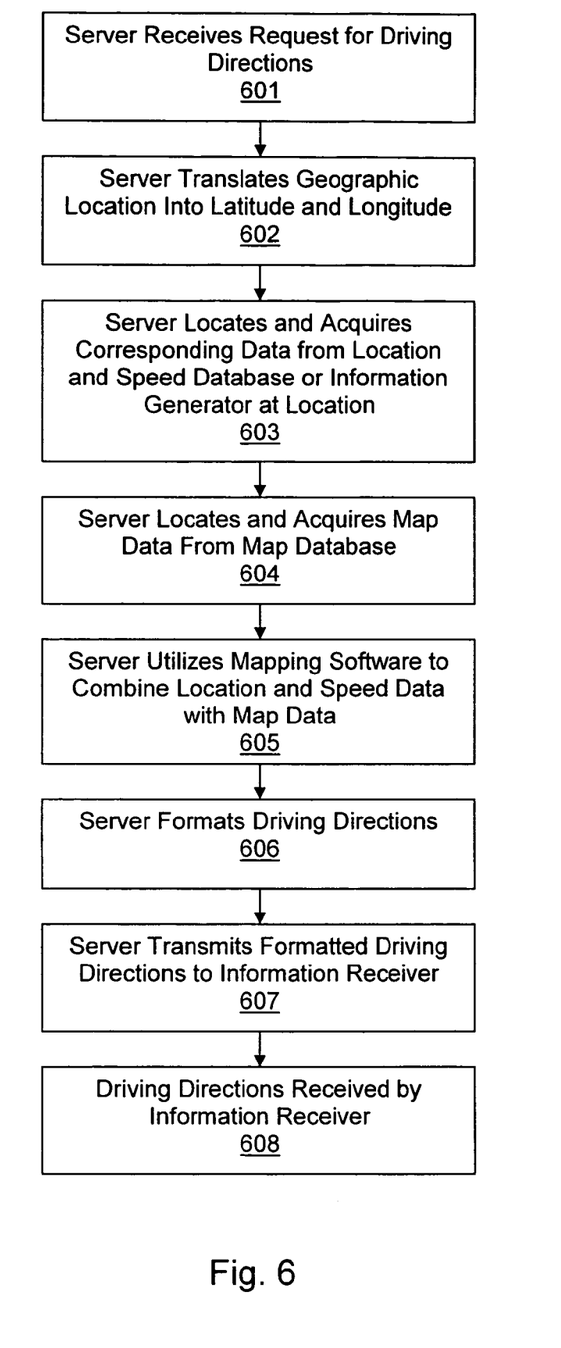
FIG. 6 is a flow chart indicating a method for sending and receiving driving directions.

Another embodiment of the invention can be utilized to provide real-time driving directions based on real-time traffic flow data as shown in FIG. 6. Normally, driving directions are computed to obtain only the shortest distance or the shortest driving time at predetermined speeds. This embodiment would operate in conjunction with map database 107 shown in FIG. 1, or an on-line driving directions service utilizing mapping software such as Mapquest®. The embodiment incorporates real-time data contained in the location and speed database 108 to calculate and produce real-time driving directions based on the known and/or calculated average speed in the corresponding road segments of the route. When the central server 110 computes the best possible route, it actually computes the driving time based on the anticipated average speeds of the different segments along the various routes and then suggests the best possible route, or multiple routes, given the known and/or calculated driving times for each.

According to the embodiment of FIG. 6, the server receives a request for driving directions at 601 from an information receiver. At 602 the server translates the geographic locations of the requested route into latitude and longitude coordinates. Once the coordinates are determined, the server locates and acquires the corresponding location and speed data at 603 from either the system location and speed database or from information-generating subscriber(s) at the corresponding location(s). The map data corresponding to these coordinates is acquired at 604. Upon receipt of both map data and location and speed data, the server utilizes mapping software at 605 to combine the data into driving directions along the requested route.

Depending upon the requesting subscriber's method of receiving traffic flow data, at 606 the server formats the driving directions into a usable format. For example, subscribers using a video display may choose to receive their traffic flow data in video format, whereas subscribers possessing a cellular telephone may choose to receive their data via voice or GPS coordinates. Once the server has correctly formatted the driving directions, at 607 the server transmits the formatted driving directions to the information receiver, and that receiver completes the transaction upon receipt of the driving directions at 608. One of skill in the art would note that the server can also assign points in this embodiment for billing purposes.

Figure 7:
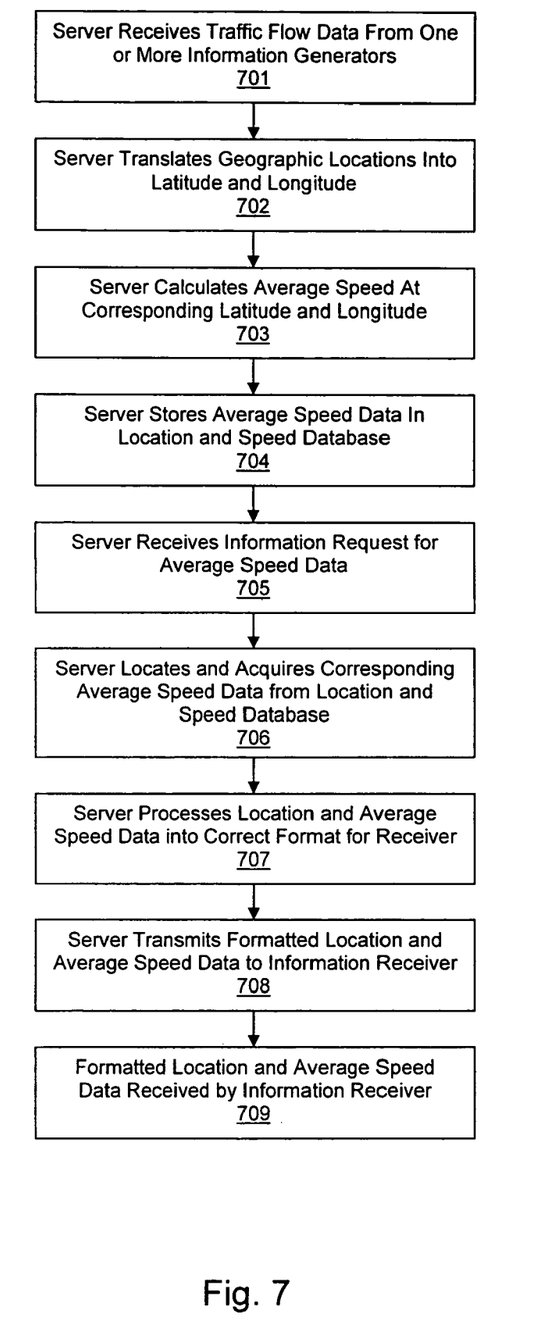
FIG. 7 is a flow chart indicating a method for sending and receiving average speed data.

FIG. 7 indicates one way in which a preferred embodiment may be enhanced by the central server's ability to calculate average traffic flow conditions in any given area based upon data received from information generators. In this method, the server receives traffic flow data from one or more information generators at 701. The server then translates the geographic locations at 702 into latitude and longitude. Average speed at the corresponding latitude and longitude is calculated at 703, using successive location information acquired from information generators, and stored in the location and speed database at 704.

When the server at 705 receives an information request for average speed data, the server then locates and acquires the corresponding average speed data at 706 from the location and speed database. Once location and average speed data are acquired, the server at 707 processes the data into an appropriate format required by the specific information-receiving subscriber. The location and average speed data are transmitted at 708 to the information receiver. The transaction is completed at 709 upon receipt of the location and average speed data by the information receiver.

In this method, the central server computes, for example, the average speed of cars in the area of interest. One of skill in the art would note that the server may also assign points in this embodiment for billing purposes. The central server can also update the average speed as often as necessary by tracking the speed of information generators passing through the area.

This method has, however, one potential deficiency. If the area of interest is such that information generators include not only automobiles, but also pedestrians, then the average speed might include the speed of pedestrians. False information on traffic flow could result. Because the invention can provide traffic flow data for both automobiles and pedestrians (as well as for any vehicle or moving object) in any given area, a mechanism can be provided to avoid confusing data from automobiles with that from pedestrians and other moving objects.

All information generators can be provided with mechanisms to notify the central server whether they are driving, walking, etc., so that data for each type of traffic flow can be kept in separate databases. An example of such a mechanism is an automobile-based GPS system that would always send a signal clarifying that the information it generates is from an automobile. Another example is a dedicated button on a cellular telephone, PDA, etc. that is pressed to notify the central server whether the device is being used in an automobile or by a pedestrian. As discussed earlier, such information-generating subscribers can be awarded positive points for properly updating their mode of transport.

An alternative means for detecting and collecting the speed of a car may be utilized. A speed detection device may be installed inside an automobile or within a cellular device used in an automobile. Referring to FIG. 1, if a cellular device is used, the speed detection device would then interface with the cellular device using a standard data interface or within a mobile network via the mobile network base station 104 of FIG. 1 over the radio channels of the mobile network 105. The central server would then receive directly both the location and the speed of the information generator 101. In this embodiment, the central server 110 does not need to take sequential location information as a function of time. Instead, speed data are collected directly from the speed-sensing device in the automobile or the cellular device.

Moreover, the invention allows a service provider to provide a service involving accurate, reliable, and up-to-date traffic information gathering and disbursement. The invention is not, however, limited only to automobile or roadway traffic applications but can also be used for any application in which a user desires to monitor the movement of one or more vehicles (conveyances). For example, the human body is a vehicle that can be monitored as pedestrian traffic. Similarly, an object can be monitored as it is conveyed through a factory, and a package can be monitored as it moves through the delivery process. These examples are offered by way of illustration of the invention's versatility and not meant to limit the invention in any way.

The present invention may be embodied in other specific forms without departing from its spirit of essential characteristics. The described embodiments are to be considered in all respects only illustrative and not restrictive. The scope of the invention is, therefore, indicated by the appended claims, rather than by the foregoing description. All changes, which come within the meaning and range of equivalency of the claims, are to be embraced within their scope.

What is claimed is:

1. A method of monitoring movement of one or more vehicles, comprising the acts of:
   receiving traffic flow information from an information generator;
   awarding points to the information generator in response to said receiving;
   storing said traffic flow information;
   transmitting said traffic flow information to an information receiver;
   deducting points from the information receiver in response to the transmitting; and
   storing a record of said receiving and said transmitting.

2. The method of claim 1, wherein the traffic flow information is recently updated or continuously updated.

3. The method of claim 1, wherein said traffic flow information is received or transmitted via wireless device, GPS-enabled device, public switched telephone network, the Internet, radio station, radio transceiver, voice, and/or electronic traffic sign.

4. The method of claim 1, wherein said traffic flow information is received from sensors within a roadway or a camera.

5. The method of claim 1, wherein said traffic flow information is converted into the desired format prior to said act of transmitting.

6. The method of claim 1, wherein said traffic flow information comprises automobile traffic data or pedestrian traffic data.

7. The method of claim 1, wherein said traffic flow information comprises electronic transmissions comprising one or more of location data, speed data, photographs, video, or spoken word.

8. The method of claim 1, wherein an average of said traffic flow data is calculated.

9. The method of claim 1, wherein said traffic flow data comprises an average speed of vehicles or pedestrians in the geographic area of said information generator.

10. The method of claim 1, wherein said act of receiving comprises the act of receiving said traffic flow information from a combination of two or more devices.

11. A method of monitoring movement of one or more vehicles, comprising the acts of:
   receiving traffic flow information from an information generator;
   storing said traffic flow information;
   assigning positive points to said information generator in response to the receiving;
   transmitting said traffic flow information to an information receiver; and
   assigning negative points to said information receiver in response to the transmitting.

12. The method of claim 11, wherein said positive and negative points are utilized for billing purposes.

13. The method of claim 11, wherein said positive points are variable in relation to the manner in which said act of receiving traffic flow information from said information generator is accomplished.

14. The method of claim 11, wherein said negative points are variable in relation to the manner in which said act of transmitting traffic flow information to said information receiver is accomplished.

15. The method of claim 11, wherein said traffic flow information comprises one or more of location data, speed data, photographs, video, or spoken word.

16. The method of claim 11, wherein an average of said traffic flow information is calculated.

17. The method of claim 11, wherein said traffic flow information comprises an average speed of vehicles in the geographic area of said information generator.

18. The method of claim 11, wherein said traffic flow information is converted into a desired format prior to said act of transmitting.

19. The method of claim 11, wherein said traffic flow information comprises automobile traffic data or pedestrian traffic data.

* * * * *

UNITED STATES PATENT AND TRADEMARK OFFICE
CERTIFICATE OF CORRECTION

PATENT NO.       : 7,599,788 B1                                         Page 1 of 1
APPLICATION NO.  : 11/295644
DATED            : October 6, 2009
INVENTOR(S)      : Banerjee et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 770 days.

Signed and Sealed this

Twenty-eighth Day of September, 2010

David J. Kappos
*Director of the United States Patent and Trademark Office*